United States Patent
Germanetti

(10) Patent No.: US 9,536,358 B2
(45) Date of Patent: Jan. 3, 2017

(54) METHOD AND A DEVICE FOR DETERMINING AND OPTIMIZING PARAMETERS THAT ARE CHARACTERISTIC OF THE OPERATION OF A ROTARY WING AIRCRAFT

(71) Applicant: AIRBUS HELICOPTERS, Marignane (FR)

(72) Inventor: Serge Germanetti, Marseilles (FR)

(73) Assignee: Airbus Helicopters, Cedex (FR)

( * ) Notice: Subject to any disclaimer, the term of this patent is extended or adjusted under 35 U.S.C. 154(b) by 0 days.

(21) Appl. No.: 15/059,440

(22) Filed: Mar. 3, 2016

(65) Prior Publication Data

US 2016/0260266 A1 Sep. 8, 2016

(30) Foreign Application Priority Data

Mar. 4, 2015 (FR) ...................................... 15 00411

(51) Int. Cl.
*G07C 5/08* (2006.01)
*B64D 43/00* (2006.01)
*B64C 27/04* (2006.01)

(52) U.S. Cl.
CPC ............. *G07C 5/0825* (2013.01); *B64C 27/04* (2013.01); *B64D 43/00* (2013.01)

(58) Field of Classification Search
CPC ........ G07C 5/0825; B64C 27/04; B64D 43/00
(Continued)

(56) References Cited

U.S. PATENT DOCUMENTS 3,754,440 A * 8/1973 Edgerton ............... G01C 23/00
701/14
5,886,649 A * 3/1999 Francois ................ B64D 43/00
340/945
(Continued)

FOREIGN PATENT DOCUMENTS

DE          29703902       6/1997
EP           2505502       10/2012
(Continued)

OTHER PUBLICATIONS

French Search Report for French Application No. 1500411, Completed by the French Patent Office on Jan. 7, 2016, 7 Pages.

*Primary Examiner* — McDieunel Marc
*Assistant Examiner* — James E Stroud
(74) *Attorney, Agent, or Firm* — Brooks Kushman P.C.

(57) ABSTRACT

A method of determining parameters that are characteristics of the operation of a vehicle having a power plant with at least one engine and mechanical transmission means, sensors, and display means. During the method, various items of information about the aircraft, its state and/or its operation and/or its environment are measured, and then, for at least one parameter $P_i$ relating to the state and the operation of the aircraft there are determined a first limit value $P_i\_lim$ for the parameter $P_i$, a second value $P_i\_X$ for each parameter $P_i$ to enable the aircraft to perform a predetermined maneuver X, and an instantaneous third value $P_i\_inst$ for each parameter $P_i$. Thereafter, each first, second, and third values $P_i\_lim$, $P_i\_X$, $P_i\_inst$ is displayed simultaneously in order to show up the relative position of second and third values $P_i\_X$ and $P_i\_inst$ relative to a first value $P_i\_lim$ for each parameter $P_i$.

23 Claims, 3 Drawing Sheets

(58) Field of Classification Search
USPC .......................................................... 701/14
See application file for complete search history.

(56) References Cited

U.S. PATENT DOCUMENTS

| | | | | |
|---|---|---|---|---|
| 5,908,485 | A * | 6/1999 | Germanetti | G01D 21/02 701/100 |
| 5,915,273 | A * | 6/1999 | Germanetti | B64D 43/00 73/178 H |
| 5,986,580 | A * | 11/1999 | Permanne | B64D 43/00 244/17.11 |
| 6,195,598 | B1 * | 2/2001 | Bosqui | B64D 43/00 340/963 |
| 6,411,869 | B2 * | 6/2002 | Permanne | 244/17.11 |
| 8,825,228 | B2 | 9/2014 | Corpron et al. | |
| 2001/0044679 | A1 * | 11/2001 | Permanne | B64D 43/00 701/3 |
| 2005/0278084 | A1 | 12/2005 | Certain | |
| 2008/0237392 | A1 * | 10/2008 | Piasecki | B64C 27/26 244/6 |
| 2009/0186320 | A1 * | 7/2009 | Rucci | B64C 27/04 434/33 |
| 2010/0312421 | A1 * | 12/2010 | Eglin | B64C 27/04 701/14 |
| 2014/0117148 | A1 * | 5/2014 | Dyrla | B64C 27/14 244/17.13 |

FOREIGN PATENT DOCUMENTS

| | | |
|---|---|---|
| FR | 2749545 | 12/1997 |
| FR | 2756256 | 5/1998 |
| WO | 2006081334 A2 | 8/2006 |
| WO | 2006081334 A3 | 8/2006 |

* cited by examiner

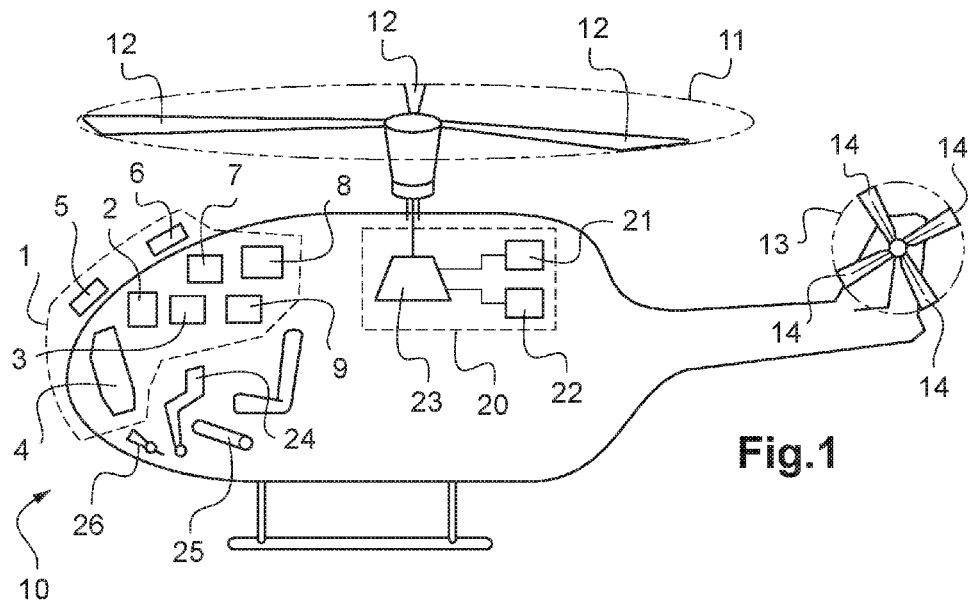
Fig.1
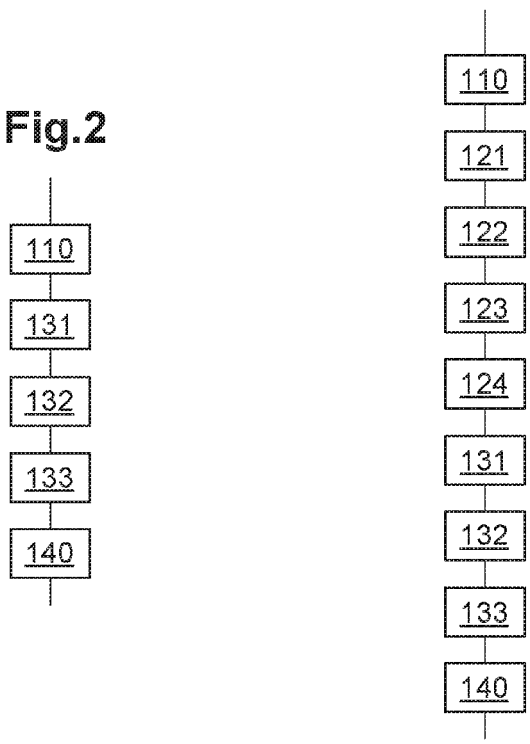
Fig.2
Fig.3

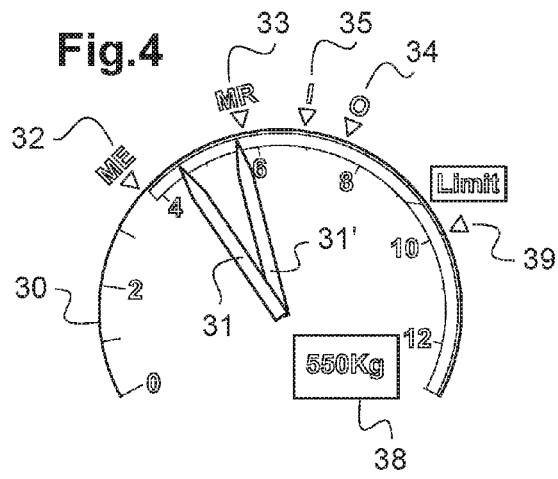
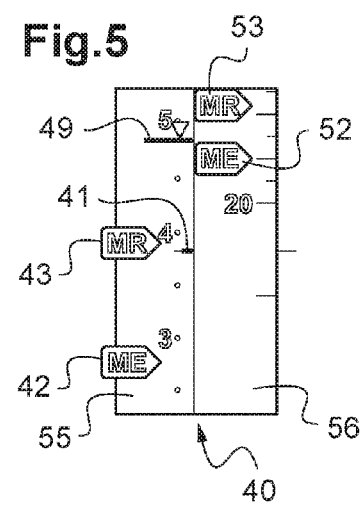
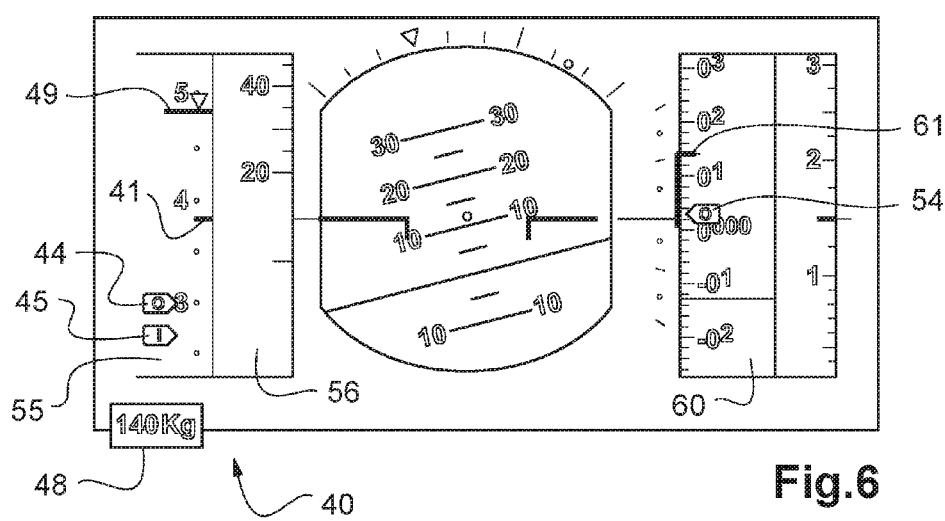
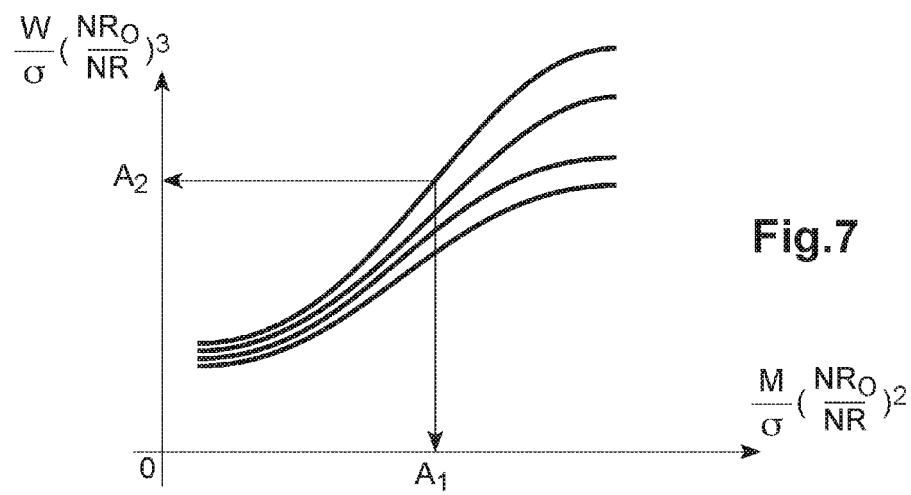

METHOD AND A DEVICE FOR DETERMINING AND OPTIMIZING PARAMETERS THAT ARE CHARACTERISTIC OF THE OPERATION OF A ROTARY WING AIRCRAFT

CROSS REFERENCE TO RELATED APPLICATION

This application claims priority to French patent application No. FR 15 00411 filed on Mar. 4, 2015, the disclosure of which is incorporated in its entirety by reference herein.

BACKGROUND OF THE INVENTION (1) Field of the Invention

The present invention relates to the field of assisting the piloting of vehicles, and in particular of rotary wing aircraft.

The present invention relates to a method and a device for determining and optimizing parameters that are characteristic of the operation of a vehicle, and in particular of a rotary wing aircraft.

(2) Description of Related Art

A vehicle is generally operated while monitoring several characteristic parameters by using instruments situated on an instrument panel of the vehicle. These characteristic parameters represent the current operation of the vehicle and in particular of its engine or its power plant.

For physical reasons, there exist numerous limits on such characteristic parameters that need to be taken into account at all times during the operation of the vehicle. These various limits may depend on external conditions and also on the mode of operation of the vehicle.

For example, for a self-propelled vehicle, these characteristic parameters may be the speed of rotation of its engine, the temperature of its engine cooling water, or the temperature of its engine lubricating oil.

In another example, the vehicle may be a rotary wing aircraft having a power plant with two turboshaft engines and a main gearbox, the power plant driving rotation of at least one main rotor and possibly of an anti-torque rotor, such as a tail rotor. Under such circumstances, these characteristic parameters may include, among others: the speed of rotation Ng of the gas generator of each engine, the gas ejection temperature T4 at the inlet to the free turbine of each engine, and the drive torque $C_m$ from each engine.

Thus, while a vehicle is in operation, a pilot of the vehicle needs to monitor continuously the current values of these characteristic parameters on various instruments situated on the instrument panel of the vehicle, and to compare the current values of these characteristic parameters with their respective limits.

For a rotary wing aircraft having a power plant with two turboshaft engines, the pilot needs to act continuously during operation of the aircraft to monitor at least three instruments per engine, i.e. at least six instruments. The pilot is then assumed to be capable of detecting, for each engine, any inconsistency between the current values of those characteristic parameters and their respective limits on those at least six instruments. This requires particular attention on the part of the pilot, who also needs to be concentrating on actually flying the aircraft.

In addition, those limits generally differ depending on the stage of flight of the aircraft and/or on external conditions, such as altitude, for example. During each stage of flight and/or depending on external conditions and on the mode of operation of the power plant, the maximum power that can be delivered by the power plant differs, and the length of time for which it is available can also be limited.

For example, while the aircraft is taking off, a maximum takeoff power MTOP can be used for a limited duration of about five to ten minutes, corresponding to a level of torque for the main gearbox and to a level of power and of heating for each engine that can be accepted without significantly degrading the power plant. Likewise, after the stage of taking off, there is a maximum continuous power MCP that can be used continuously without any limit on duration.

Furthermore, there are also contingency ratings at extra high power that are used on a power plant having at least two engines when one of the engines has failed. The valid engine(s) can then deliver contingency power levels for limited durations, these contingency power levels being greater than the maximum continuous power MCP in order to compensate for the failure. Nevertheless, using such contingency ratings generally requires specific maintenance operations to be performed thereafter.

Consequently, the limits on the various parameters that are characteristic of the operation of the aircraft can differ, in particular depending on the power available from each engine.

At present, certain kinds of assistance given to the pilot make it possible to limit the parameters that the pilot must monitor.

In particular, Documents FR 2 749 545 and FR 2 756 256 are known, which describe a first limit indicator (FLI). That first limit indicator identifies among various characteristic parameters the characteristic parameter that is critical, i.e. the parameter that is the closest to its limit value. The current value of this critical characteristic parameter and its limit value are then grouped together on a single display, respectively for each engine, where appropriate, thereby limiting the number of instruments needed for monitoring the operation of the aircraft, thereby simplifying the pilot's task. Such FLIs thus make it possible to display an available power margin for the aircraft or for each engine, by means of the current value of the critical characteristic parameter and its limit value.

For example, the current value of the critical characteristic parameter and its limit value may be displayed on a scale graduated in engine torque for each of the engines, thereby characterizing the power margin available from each engine of the aircraft, as described in Document FR 2 749 545.

The current value of the critical characteristic parameter and its limit value can also be displayed on a scale that is graduated in collective pitch, where the collective pitch is the angle of incidence of the blades of the main rotor of the aircraft relative to the incident wind, and as induced by a collective pitch control for those blades, thereby characterizing the power margin that is available for the aircraft as a whole, as described in Document FR 2 756 256.

Also known are Documents WO 2006/081334 and US 2005/278084 that describe indicators for an aircraft that determine and display at least the value of the critical characteristic parameter.

The indicator of Document WO 2006/081334 also determines and displays a characteristic parameter of value that is important and that may correspond to a predetermined maneuver of the aircraft.

The indicator of Document US 2005/278084 also determines and displays a predictive value for the critical characteristic parameter, which predictive value is determined as a function of its current value and of its variation.

In addition, Document EP 2 505 502 describes a method and a device for assisting in the piloting of an aircraft having two rotors, e.g. a lift rotor and an anti-torque tail rotor. A power margin relative to a known maximum power from the engine of the aircraft is determined using that one of the characteristic parameters that has a value that is the closest to its operating limit. A limit curve for available power that takes this power margin into account is displayed to the pilot in the form of a diagram in a reference constituted by a first collective pitch of the first rotor and a second collective pitch of the second rotor. A pointer that is characterized by the current positions of the first and second collective pitches is also displayed. The pilot thus knows the additional power that is available from the first and second rotors.

In addition, a curve that takes account of an engine damage threshold can be displayed, which threshold corresponds to the maximum power that can be used without running the risk of damaging the engine. This usable maximum power is determined on the basis of the known maximum power of the engine of the aircraft as supplied by the manufacturer of the engine.

Finally, Document DE 2 970 3902 forms part of the technological background of the invention.

Nevertheless, the limits used by the instruments of the panel instrument and by the FLI in particular do not represent the real limits for each engine, but rather predetermined limits that correspond for example to a minimum guaranteed power level from an engine over its entire lifetime.

Specifically, the engine manufacturer performs calculations or carries out tests to establish available power curves for a turboshaft engine as a function in particular of the altitude of the aircraft and of the outside temperature, with this being done for each of the power ratings that can be used for each engine. Furthermore, the manufacturer determines the available power curves for different degrees of aging of each engine from a new engine to an engine that has come to the end of its lifetime.

Consequently, a minimum power level guaranteed over the entire lifetime of an engine is defined. The value of this guaranteed minimum power varies in particular as a function of the altitude of the aircraft and the outside temperature, and it corresponds to the power delivered by an aged engine, i.e. an engine that has come to the end of its maximum lifetime. Thus, any engine in normal operation, i.e. an engine that has not suffered a failure, can always deliver power that is higher and at worst that is not less than the minimum power that is guaranteed for its entire lifetime.

As a result, the instrument panel instruments and the FLI in particular that make use of limits corresponding to the guaranteed minimum power are favorable in terms of safety, since the pilot always has a level of power that is genuinely available from each engine that is generally greater than and at worst not less than the maximum power indicated by the control panel instruments or by the FLI.

In contrast, the use of each engine is not optimized, since the power used is the minimum guaranteed power and not the maximum power that is genuinely available. Specifically, each engine is under-used. The use of limits corresponding to the maximum power that is genuinely available would enable the performance of the aircraft to be improved, such as the total mass it can transport or the range it can cover, for example.

In addition, the instruments of the control panel of a vehicle and also the FLI in aircraft indicate the current values and the limits of characteristic parameters. As a result, when a pilot envisages carrying out a maneuver, the pilot must rely on experience and on the difference that can be seen between these current and limit values in order to estimate whether there is a sufficient power margin on the characteristic parameters for performing the maneuver.

Thereafter, the pilot will receive confirmation only while performing the maneuver that none of the characteristic parameters has exceeded its limits and that the maneuver can be carried out in complete safety.

Otherwise, and depending on the maneuver being performed, the pilot may interrupt the maneuver in order to return to a safe stage of flight, such that each characteristic parameter remains below its limits. This applies typically when the pilot of an aircraft begins a descent and it is possible to use the inertia of the aircraft and/or the total power available from the power plant to perform a maneuver to avoid an obstacle. Nevertheless, for certain maneuvers, going back to the previous situation is not possible once the maneuver has been started and that can lead to an accident, e.g. while landing and during the transition from no ground effect to the ground effect applying.

Such poor estimation by the pilot of the available margin, in particular in terms of power, lies behind numerous rotary wing aircraft accidents, in particular during stages of landing, while hovering, in particular close to the ground, and while taking off in a purely vertical mode.

BRIEF SUMMARY OF THE INVENTION

An object of the present invention is thus to propose a method and a device making it possible to avoid the above-mentioned limitations, in particular while enabling the pilot to visualize simultaneously the current values and the real limits of at least one parameter characteristic of the operation of the vehicle, together with the value of each characteristic parameter needed for performing a predetermined maneuver.

The present invention provides a method of determining parameters that are characteristic of a vehicle, the vehicle having a power plant with at least one engine and mechanical power transmission means, control means for controlling movements of the vehicle, a plurality of sensors, computer means, at least one memory, and display means.

By way of example, the vehicle is a rotary wing aircraft having a main rotor with main blades, an anti-torque rotor with secondary blades, and a power plant. The mechanical power transmission means comprise a main gearbox driving rotation of the main rotor and of the anti-torque rotor by means of at least one engine, which may be a turboshaft engine. The control means are means for controlling variation in the collective pitch and in the cyclic pitch of the main blades of the main rotor and also in the collective pitch of the secondary blades of the anti-torque rotor.

During this method of determining parameters that are characteristic of the vehicle, the following steps are performed:

measuring various items of information about the environment of the vehicle and/or the state and the operation of the vehicle and/or the state and the operation of the power plant and/or the state of the control means and/or the position and the movements of the vehicle relative to its environment;

determining at least a first parameter $P_i$ lim equal to a limit value of a parameter $P_i$ that is not to be exceeded, $P_i$ being a characteristic parameter relating to the state or the operation of the vehicle, or to the state or the operation of the power plant, or to the states of the control means, or to the position or the movements of the vehicle relative to its environment;

determining at least one second value $P_i\_X$ to which the parameter $P_i$ needs to be equal in order to enable the vehicle to perform a predetermined maneuver X; and simultaneously displaying on a common graphics type representation each first value $P_i\_lim$ and each second value $P_i\_X$ in order to show up clearly the relative position of a first value $P_i\_lim$ relative to each second value $P_i\_X$ for each parameter $P_i$.

The parameter $P_i$ may be a characteristic parameter relating to the state or the operation of the power plant, such as a total power or a total torque delivered by the power plant or indeed an outlet torque from the mechanical transmission means. The parameter $P_i$ may also be a parameter relating to the state or the operation of an engine of the power plant, such as a power or indeed a torque delivered by that engine, a temperature inside the engine, or indeed a speed of rotation of an element of the engine, such as a transmission shaft.

The parameter $P_i$ may also be a parameter relating to the position or to the movements of the vehicle relative to its environment, e.g. a speed of the vehicle relative to the air or indeed a speed of the vehicle relative to the ground, or else a height of the vehicle above a reference such as the ground.

When the vehicle is a rotary wing aircraft, the parameter $P_i$ may also be selected, among others, from: a main rotor torque or indeed an anti-torque rotor torque; a position of a control surface of the aircraft or indeed a value for the collective or cyclic pitch of the main blades of the main rotor or of the secondary blades of the anti-torque rotor; and a position of the collective or cyclic pitch controls for the main blades of the main rotor or indeed a position of the collective pitch control for the secondary blades of the anti-torque rotor.

The parameter $P_i$ may also be a logical or arithmetic combination of at least two of the above-mentioned characteristics.

As a result, each parameter $P_i$ serves to characterize the operation or the state of the vehicle and/or of its power plant, or indeed a position or a speed of the vehicle.

Advantageously, each first value $P_i\_lim$ is equal to a current limit value of the parameter $P_i$ and not to a predefined limit. Each first value $P_i\_lim$ is determined from one or more of the various measured items of information. This first value $P_i\_lim$ thus takes account of the current characteristic of the vehicle, of its power plant, and of its environment. This first value $P_i\_lim$ may also take account of a state of aging of the vehicle and/or of its power plant. Each first value $P_i\_lim$ may be determined by using operating curves of the vehicle, and more particularly performance curves of the vehicle that are correlated with the power curves of the engines of the vehicle.

Advantageously, the performance curves of the vehicle are defined by taking account of the installation of each engine in the vehicle.

Each second value $P_i\_X$ is equal to a value that the parameter $P_i$ needs to take in order to enable the vehicle to perform a predetermined maneuver X. Each second value $P_i\_X$ may be determined from one or more of the various measured items of information and from the characteristics necessary for performing the predetermined maneuver X.

Thus, the difference between the first value $P_i\_lim$ and the second value $P_i\_X$ is visible on the graphics type representation. The pilot of the vehicle can see directly whether there is a margin on the parameter $P_i$ for performing the predetermined maneuver X relative to the first value $P_i\_lim$.

The second values $P_i\_X$ to which the parameter $P_i$ needs to be equal to enable the vehicle to perform the predetermined maneuver X may form a range of values for the parameter $P_i$. This range is thus constituted by second values $P_i\_X$ that are acceptable to enable the vehicle to perform the maneuver X with safety margins. These safety margins make it possible for example to take account of the approximations in the measurements of the various items of information, of the characteristics needed for performing the predetermined maneuver X, or indeed of knowledge about the mass of the vehicle.

Furthermore, during this method of determining parameters characteristic of a vehicle, it is possible to determine a third value $P_i\_inst$ that is equal to an instantaneous value of each parameter $P_i$, and then to display each third value $P_i\_inst$ on the graphics type representation.

Thus, the pilot of the vehicle can see directly both a difference between the third value $P_i\_inst$ and the first value $P_i\_lim$ and also the margin available to the pilot between the third value $P_i\_inst$ and the second value $P_i\_X$ needed to perform the predetermined maneuver X.

Furthermore, the graphics type representation may be of various forms. For example, the graphics type representation may be a dial of substantially circular shape. A pointer indicates the third value $P_i\_inst$ and marks on the outside of the dial indicate the first value $P_i\_lim$ and the second value $P_i\_X$. The first value $P_i\_lim$ may also be represented by a zone of varying color, e.g. going from green through orange to red on the dial.

The graphics type representation may also use a vertical scale, the first, second, and third values $P_i\_lim$, $P_i\_X$, $P_i\_inst$ being represented by movable horizontal marks or by scrolling strips of varying colors.

It is possible to display each second value $P_i\_X$ and each third value $P_i\_inst$, if any, on the display means of the vehicle as a percentage of the first value $P_i\_lim$ corresponding to the parameter $P_i$, this first value $P_i\_lim$ then corresponding to a 100% indication on the display means of the vehicle. This type of display makes it possible to ignore the numerical values of the first, second, and third values $P_i\_lim$, $P_i\_X$, $P_i\_inst$. The pilot of the vehicle can thus easily verify that each second value $P_i\_X$ and each third value $P_i\_inst$ is consistent with the first value $P_i\_lim$.

Nevertheless, the first values $P_i\_lim$, the second values $P_i\_X$, and the third values $P_i\_inst$ may be displayed as percentages of a reference value for the parameter $P_i$, the reference value for the parameter $P_i$ then corresponding to an indication of 100% on the display means of the vehicle. For example, the parameter $P_i$ may be the outlet torque from the mechanical transmission means of the vehicle, and the reference value for the parameter $P_i$ may be the limit torque that can be accepted by the mechanical transmission means of the vehicle in continuous operation.

Likewise, the parameter $P_i$ may be the speed of rotation Ng of the gas generator of a turboshaft engine of the vehicle, the reference value for the parameter $P_i$ being the maximum speed of rotation that is acceptable by the gas generator in continuous operation.

In addition, when the vehicle is a rotary wing aircraft having a main rotor with main blades, the control means may comprise means for controlling variation in the collective pitch of the main blades, and the display means of the aircraft may display values for the collective pitch of the main blades that correspond respectively to each first value $P_i\_lim$, to each second value $P_i\_X$, and to each third value $P_i\_inst$, if any. Since adjusting the collective pitch of the main blades is one of the essential elements for piloting a rotary wing aircraft, with the pilot acting thereon directly and continuously, the pilot can thus visualize directly the interaction between the various values associated with the parameter $P_i$ and these values for the collective pitch of the main blades of the main rotor.

The correspondence between the collective pitch values and the values $P_{i\_}lim$, $P_{i\_}X$, and $P_{i\_}inst$ may be established via the power at the main rotor of the aircraft.

Furthermore, in order to limit the amount of information supplied to the pilot of the vehicle, it is possible to display information relating to a reduced number of parameters $P_i$, these parameters $P_i$ being the most critical parameters. For example, each first value $P_{i\_}lim$, each second value $P_{i\_}X$, and each third value $P_{i\_}inst$ is displayed for that one of the parameters $P_i$ among two parameters $P_i$ and $P_j$ having the smallest difference between the first value $P_{i\_}lim$ and the third value $P_{i\_}inst$ as associated respectively with each of the parameters $P_i$ and $P_j$.

By way of example, it is possible to display each first value $P_{i\_}lim$, each second value $P_{i\_}X$, and each third value $P_{i\_}inst$, if any, on a first limit indicator of the aircraft, regardless of whether this display is displayed as a percentage of the first value $P_{i\_}lim$ or as values for the collective pitch of the main blades of the main rotor.

One of the determining criteria for the operation of a vehicle is the total power available from its power plant in order to operate the vehicle, and in particular in order to move it. Thus, in order to monitor this total power of the power plant, the parameter $P_i$ may be the total power delivered by the power plant of the vehicle. The parameter $P_i$ may also be the power delivered by each engine of the power plant, thus making it possible to monitor more closely the sharing of power between the engines of the power plant.

Furthermore, the total power delivered by the power plant or the power delivered by an engine of the power plant is a function of various parameters of the power plant and/or of each engine of the power plant.

For example, the instantaneous total power $W_{inst}$ delivered by a power plant is substantially equal to the instantaneous power delivered by an engine when the power plant has only one engine. This instantaneous total power $W_{inst}$ may be defined for example using the formula:

$$W_{inst} = C_m \cdot N_m$$

where $N_m$ is an instantaneous speed of rotation of the transmission shaft of the rotor and $C_m$ is the driving torque delivered by the engine to the transmission shaft.

The instantaneous total power $W_{inst}$ delivered by the power plant when it has a plurality of engines is substantially equal to the sum of the instantaneous powers delivered respectively by each of the engines of the power plant, such that:

$$W_{inst} = \sum_n [C_m \cdot N_m]_n$$

In general, a power plant has engines that are identical and the total power delivered by the power plant is delivered in substantially equal manner by each of the engines.

Furthermore, when the vehicle is a rotary wing aircraft having a main rotor and an anti-torque rotor, the total power delivered by the power plant of the aircraft is shared between firstly flight power of the aircraft, i.e. the power specifically enabling the aircraft to fly, and secondly accessory power for powering equipment on board the aircraft.

By way of example, this accessory power is used to power air conditioning of the aircraft cabin, to power electrical equipment on board the aircraft such as avionics, or indeed to power hydraulic equipment of the aircraft. This accessory power, made up mainly of electrical power and hydraulic power, may be determined in known manner.

The flight power of the aircraft is shared between the main rotor and the anti-torque rotor so as to provide the aircraft with lift and so as to enable it to move. This flight power of the aircraft is thus the sum of the power delivered to the main rotor plus the power delivered to the anti-torque rotor.

The power at the main rotor may be defined in known manner using the formula $W_{RP} = C_R \cdot NR$, where NR is the instantaneous speed of rotation of the main rotor of the aircraft, and $C_R$ is the rotor torque at the mast for driving the main rotor in rotation.

The instantaneous power at the anti-torque rotor may also be determined in known manner, this instantaneous power at the anti-torque rotor being used essentially to oppose torque due to the reaction of the main rotor of the aircraft to the driving torque used to set the main rotor into rotation. For example, this instantaneous power at the anti-torque rotor may be determined depending on the speed of advance of the aircraft: when this speed of advance of the aircraft is zero, the anti-torque rotor is then alone in opposing this torque, whereas when the speed of advance of the aircraft is non-zero, a transverse aerodynamic force that is proportional to the square of the speed of advance is generally generated by a substantially vertical tail fin situated in the proximity of the tail rotor, thereby enabling the instantaneous power at the anti-torque rotor to be reduced.

Furthermore, when each engine of the power plant is a turboshaft engine having a gas generator and a free turbine, the power delivered by each engine is a function of the outlet torque from the engine, of an internal temperature T4 of the gas at the inlet to the free turbine of the engine, and of the speed of rotation Ng of the gas generator of the engine. The instantaneous power $Wm_{inst}$ delivered by each engine can then be defined such that $W_{inst} = C_m \cdot Ng$, $C_m$ being the driving torque relating to the gas generator.

Consequently, when the vehicle is a rotary wing aircraft, the parameter $P_i$ may be the rotor torque $C_R$ at the mast for driving the main rotor, or else the driving torque $C_m$ delivered by an engine of the power plant, and when the engine is a turboshaft engine, the parameter $P_i$ may be the internal temperature T4 of the gas at the inlet to the free turbine of a turboshaft engine, or indeed the speed of rotation Ng of the gas generator of a turboshaft engine. The values of this parameter $P_i$ can then be determined by way of example from the power delivered by each engine of the power plant or from the flight power of the aircraft.

Thus, in order to monitor this parameter $P_i$ in a variant of the method of determining parameters that are characteristic of the operation of a vehicle, the following steps may be performed:

determining an available power margin from each engine of the power plant of the vehicle relative to a guaranteed minimum power, this available power margin characterizing a state of aging of each engine of the power plant;

determining an instantaneous power $Wm_{inst}$ delivered by each engine of the power plant;

determining an available maximum power at each engine of the power plant while taking account of the available power margin;

determining at least one power characteristic of each engine of the power plant that corresponds to the vehicle performing a predetermined maneuver X;

determining at least one first value $P_{i\_}lim$ corresponding to the available maximum power from each engine;

determining at least one second value $P_i\_X$ corresponding to the characteristic power from each engine to enable the vehicle to perform a predetermined maneuver X;

determining at least one third value $P_i\_inst$ corresponding to the instantaneous power $Wm_{inst}$ delivered by each engine; and displaying each first value $P_i\_lim$ and each second value $P_i\_X$ and each third value $P_i\_inst$ simultaneously on a common graphics type representation.

By way of example, the available power margin from each engine of the power plant of the vehicle may be determined during an "engine health" inspection, also known as an engine power check (EPC). Such an engine health inspection is generally recommended by the engine manufacturer and needs to be performed regularly, particularly when the engine is a turboshaft engine. An engine health inspection serves to verify the operating state of an engine and to determine the level of deterioration and/or aging of the engine. An engine health inspection thus makes it possible to verify periodically the maximum and real levels of performance available from the engine compared with the guaranteed minimum performance levels.

An engine health inspection is thus performed by comparing the current performance of the engine with the performance of the same engine as obtained on a test bench and as declared by the manufacturer. The engine health inspection serves to determine a margin for one or more monitoring parameters of the engine relative to a limit value for each monitoring parameter, and consequently to determine the available power margin for an engine, which margin is the difference between the maximum power that it can deliver and the maximum guaranteed power for current environmental conditions. By way of example, the current environmental conditions comprise information about the environment of the vehicle, and more particularly about atmospheric conditions. In addition, by using these monitoring parameters, it is possible to deduce whether the engine has suffered any deterioration and whether it needs to be subjected to maintenance operations, in particular in order to be able to deliver once more the levels of mechanical power for which it is adapted.

For example, if the engine is a turboshaft engine, a monitoring parameter may be the internal temperature T4 of the gas at the inlet to the free turbine, the speed of rotation Ng of the gas generator, or indeed the driving torque $C_m$ delivered by the engine.

In addition, each engine health inspection needs to be performed using a procedure as predetermined by the manufacturer. This engine health inspection may be performed in flight or between two flights.

The instantaneous power $Wm_{inst}$ delivered by each engine of the power plant may be determined in known manner, e.g. from the instantaneous torque delivered by the engine. In addition, when the engine is a turboshaft engine, the instantaneous power may be determined by using the instantaneous internal temperature T4 of the gas at the inlet to the free turbine of the turboshaft engine or indeed the instantaneous speed of rotation Ng of its gas generator.

Likewise, a characteristic power for each engine of the power plant corresponding to the vehicle performing a predetermined maneuver X can also be determined. Each characteristic power is needed for performing a predetermined maneuver X, which may in particular consume a large amount of mechanical power delivered by each engine.

By way of example, when the vehicle is a rotary wing aircraft, the predetermined maneuver X may be hovering or landing.

The maximum power available from each engine of the power plant is determined by using performance curves of the vehicle and by taking account of the available power margin relative to the guaranteed minimum power. The available maximum power is a function of the current environmental conditions and of the stage of flight of the vehicle when the vehicle is an aircraft.

When the power plant has only one engine, the power that the engine must deliver for performing the predetermined maneuver X is equal to the sum of the characteristic power of the engine plus the accessory power of the vehicle.

When the power plant has a plurality of identical engines, the total power to be delivered by the power plant for performing the predetermined maneuver X is equal to the sum of the characteristic power from each engine plus the accessory power of the vehicle.

This total power delivered by the power plant is generally delivered in equal shares by each engine. Nevertheless, a particular distribution may be defined among the engines of the power plant, in particular when the engines are different.

As mentioned above, in order to limit the amount of information supplied to the pilot of the vehicle, each first value $P_i\_lim$, each second value $P_i\_X$, and each third value $P_i\_inst$ may be displayed for that one of the parameters $P_i$ from at least two parameters $P_i$ and $P_j$ for which the difference between the instantaneous power and the maximum available power associated with each of the parameters $P_i$ and $P_j$ is the smallest, possibly for each engine of the power plant when it has a plurality of engines.

Furthermore, it is possible to use an estimated mass M of the vehicle in order to determine each characteristic power of each engine of the power plant to enable the vehicle to perform a predetermined maneuver X. This is useful in particular when the vehicle is a rotary wing aircraft. Under such circumstances, the power plant of the aircraft needs to provide sufficient power to ensure that the lift from the main rotor can support at least the estimated mass M of the aircraft. This estimated mass M of the vehicle may be determined before the aircraft takes off. In flight, the instantaneous mass of the aircraft decreases in particular as a result of fuel being consumed, and it thus becomes less than the estimated mass M. Consequently, this estimated mass M of the vehicle may be used to determine each characteristic power for enabling the vehicle to perform a predetermined maneuver X.

Nevertheless, this characteristic power is then overestimated compared with the mechanical power that is actually needed to enable the aircraft to perform the predetermined maneuver X, since the estimated mass M of the aircraft is greater than its instantaneous mass. This over-evaluated characteristic power goes in the direction of greater safety, since the mechanical power that is really necessary is less than the overestimated characteristic power. However, for certain maneuvers that require a large amount of mechanical power, this overestimated characteristic power may be greater than the available maximum power even though the mechanical power that is really needed to enable the aircraft to perform the predetermined maneuver X is less than the maximum power available from each engine. This leads to the maneuver not being performed by the pilot who believes wrongly that the power plant cannot deliver sufficient total power.

An estimated instantaneous mass $M_{inst}$ of the vehicle is preferably defined and used in order to determine more accurately each characteristic power needed to enable the vehicle to perform a predetermined maneuver X. By way of example, this estimated instantaneous mass $M_{inst}$ of the aircraft may be determined by calculating the consumption of fuel during a flight, with the mass of the consumed fuel then being deducted from the mass M of the aircraft as estimated before takeoff.

In addition, starting from the maximum total power available from the power plant and the estimated instantaneous mass $M_{inst}$ of the vehicle, it is possible to determine a maximum mass that can be transported by the vehicle. By using performance curves of the vehicle and by taking account of the available power margin, it is possible to determine the total mass of the vehicle for which the total power delivered by the power plant is equal to the available maximum total power. It is then possible to deduce therefrom the maximum mass that can be transported, which is the difference between the total mass and the estimated instantaneous mass $M_{inst}$ of the vehicle.

Furthermore, by determining at least one second value $P_i\_X$ and/or a characteristic power corresponding to a predetermined maneuver X, the method of determining parameters that are characteristic of the operation of a vehicle enables the pilot of the vehicle to be assisted in anticipating and possibly in performing the predetermined maneuver X. The risks associated with the predetermined maneuver X are then significantly reduced, in particular for maneuvers that have a high accident rate, with the pilot knowing, for example, whether a sufficient power margin is available in order to perform the predetermined maneuver X. Likewise, the performance of the predetermined maneuver X may also be optimized, e.g. in terms of fuel consumption.

This applies in particular when the vehicle is a rotary wing aircraft having a main rotor with main blades, an anti-torque rotor, and mechanical power transmission means comprising a main gearbox driving the main rotor and the anti-torque rotor.

By way of example, for a rotary wing aircraft, the predetermined maneuver X may be a slow descending flight for the purpose of landing, during which numerous accidents might take place, in particular during transitions between a zone where the aircraft is subjected to a ground effect and a zone where the aircraft is not subjected to the ground effect.

Close to the ground, the wash from the main rotor is returned by the ground against the fuselage and the main blades of the main rotor, thereby changing the behavior of the aircraft. The aircraft is then said to be in ground effect (IGE). This IGE zone covers a height going from the ground to about four times the diameter of the main rotor of the aircraft.

Above this IGE zone, i.e. at a height above the ground that is greater than about four times the diameter of the rotor of the aircraft, the aircraft is no longer subject to the ground effect. It is then said that the aircraft is out of ground effect (OGE).

Furthermore, when the aircraft is hovering, i.e. when its horizontal speed Vh and its vertical speed Vz are substantially zero, the functional characteristics of the aircraft are defined in particular by a series of first performance curves of the aircraft in application of a first formula:

$$\frac{W}{\sigma} \cdot \left(\frac{NR_0}{NR}\right)^3 = k \cdot f_1\left[\frac{M}{\sigma} \cdot \left(\frac{NR_0}{NR}\right)^2\right]$$

Under such circumstances, W is the flight power of the aircraft, σ is a reduction coefficient, k is a coefficient for the influence of the ground effect on the behavior of the aircraft, M is the estimated mass of the aircraft, $NR_0$ is a setpoint for the speed of rotation of the main rotor, NR is the real speed of rotation of the main rotor, and $f_1$ is a first function represented by a series of first performance curves for the aircraft having for its abscissa axis a first value:

$$A_1 = \frac{M}{\sigma} \cdot \left(\frac{NR_0}{NR}\right)^2$$

and
for its ordinate axis a second value:

$$A_2 = \frac{W}{\sigma} \cdot \left(\frac{NR_0}{NR}\right)^3.$$

The estimated mass M is preferably the estimated instantaneous mass $M_{inst}$ of the aircraft.

This series of first performance curves in application of the first function $f_1$ of the aircraft is specific to each aircraft and is provided with the flight manual of the aircraft.

The reduction coefficient σ is equal to the ratio $$\frac{P_0}{T_0},$$

where $P_0$ and $T_0$ are respectively the atmospheric pressure and the temperature around the aircraft. The atmospheric pressure $P_0$ is expressed in millibars (mb) and the temperature $T_0$ is expressed in kelvins (K).

The influence coefficient k is equal to unity when the aircraft is in an OGE zone. The influence coefficient k varies with the height of the aircraft above the ground from a minimum value to a maximum value when the aircraft is in an IGE zone. The maximum value is generally equal to 1.1 for all aircraft whereas the minimum value, which corresponds to the aircraft at ground level, varies depending on the aircraft and may lie in the range 0.6 to 0.9. By way of example, the influence coefficient k may lie in the range 0.6 to 1.1 for a given aircraft.

Thus, in order to determine a first characteristic power $W_k$ of the aircraft for performing a predetermined maneuver X when performing hovering flight, and regardless of the height Hz of the aircraft above the ground, the following steps are performed:

calculating the reduction coefficient σ such that:

$$\sigma = \left(\frac{P_0}{T_0}\right)$$

calculating the first value $A_1$ such that:

$$A_1 = \frac{M}{\sigma} \cdot \left(\frac{NR_0}{NR}\right)^2$$

measuring the height Hz of the aircraft above the ground, e.g. using a radio altimeter present in the aircraft;
determining the influence coefficient k corresponding to the height Hz of the aircraft above the ground;
using a first performance curve of the aircraft in application of the first function $f_1$ corresponding to the flight conditions of the aircraft and as a function of the first value $A_1$ to determine the second value $A_2$ such that:

$$A_2 = f_1\left[\frac{M}{\sigma} \cdot \left(\frac{NR_0}{NR}\right)^2\right];$$

and using the second value $A_2$ to calculate the first characteristic power $W_k$ of the aircraft for performing a predetermined maneuver X in the event of hovering out of the ground effect or in the ground effect depending on the influence coefficient k, such that:

$$W_k = k \cdot A_2 \cdot \sigma \cdot \left(\frac{NR}{NR_0}\right)^3$$

The first performance curves in application of the first function $f_1$ depend on the aircraft and they enable the aircraft to be characterized. The first performance curve of the aircraft, in application of the first function $f_1$ used for determining the second value $A_2$ is defined depending on the flight conditions of the aircraft, and in particular on the current environmental conditions such as atmospheric conditions. These first performance curves make it possible to determine the flight power W of the aircraft, which is the sum of the power needed by the main rotor plus the power needed by the anti-torque rotor in order to enable the aircraft to hover. The total power of the power plant of the aircraft in order to perform hovering flight is then equal to the sum of the flight power W plus the accessory power from the power plant.

Thereafter, it is possible to display the first characteristic power $W_k$ and an available maximum total power for flight of the aircraft together with the instantaneous total power consumed for flight of the aircraft simultaneously on the graphics type representation. The maximum total power available for flight of the aircraft and the instantaneous total power consumed for flight of the aircraft are equal respectively to the instantaneous total power $W_{inst}$ delivered by the power plant plus its available maximum total power minus the accessory power.

The instantaneous total power $W_{inst}$ delivered by the power plant and its available maximum total power are equal respectively to the sum of the instantaneous powers $Wm_{inst}$ delivered by each engine of the power plant and to the sum of their available maximum powers when the power plant has a plurality of engines.

The pilot can then verify the difference between the first characteristic power $W_k$ of the aircraft for performing the predetermined maneuver X and the maximum total power available for flight.

Likewise, it is possible to display a second value $P_i\_X$ corresponding to the first characteristic power $W_k$ and a third value $P_i\_inst$ corresponding to the instantaneous total power consumed for flight by the aircraft together with a first value $P_i\_lim$ corresponding to the maximum total power available for flight of the aircraft on the graphics type representation. The pilot can then verify the difference between the second value $P_i\_X$ and the first value $P_i\_lim$.

Furthermore, it is then possible for the aircraft to perform hovering flight at the height Hz in automatic manner by making use of this first characteristic power $W_k$ at the power plant while adding thereto the accessory power. For this purpose, the driving torque $C_{mk}$ of each engine of the power plant can be controlled using the influence coefficient k corresponding to the height Hz or else to control the collective pitch of the main blades of the main rotor of the aircraft so that the power plant delivers total power equal to the sum of the first characteristic power $W_k$ plus the accessory power.

By way of example, it is possible to determine a driving torque $C_{mk}$ to be delivered by each engine of the power plant corresponding to this total power, and then this driving torque $C_{mk}$ is applied to each engine of the power plant, thereby automatically achieving hovering flight at the height Hz.

For control means of the aircraft constituted by means for controlling variation in the collective and cyclic pitches of the main blades of the main rotor, it is also possible to determine a collective pitch value for these main blades that corresponds to this first characteristic power $W_k$, and then this collective pitch can be applied to the main blades of the main rotor, thereby automatically achieving hovering flight at the height Hz.

It is also possible to determine a second characteristic power $W_{k=1}$ for hovering flight of the aircraft in an OGE zone. For this purpose the influence coefficient k is defined as being equal to 1, and then using the second value $A_2$, a second characteristic power $W_{k=1}$ is calculated for the aircraft in order to enable the aircraft to perform the predetermined maneuver X when hovering out of the ground effect of the aircraft, such that:

$$W_{k=1} = A_2 \cdot \sigma \cdot \left(\frac{NR}{NR_0}\right)^3$$

Likewise, in order to determine a third characteristic power $W_{kmini}$ for hovering flight of the aircraft at ground level, the influence coefficient k is defined as being equal to a minimum value $k_{mini}$ corresponding to hovering flight of the aircraft at ground level, and then the second value $A_2$ is used to calculate the third characteristic power $W_{kmini}$ of the aircraft so as to enable the aircraft to perform a predetermined maneuver X when the aircraft is hovering with ground effect at ground level such that:

$$W_{kmini} = k_{mini} \cdot A_2 \cdot \sigma \cdot \left(\frac{NR}{NR_0}\right)^3$$

Consequently, it is possible to display the second characteristic power $W_{k=1}$ and the third characteristic power $W_{kmini}$ together with the maximum total power available for flight simultaneously on the graphics type representation. Thus, prior to engaging the predetermined maneuver X, the pilot can verify that the first and second characteristic powers $W_{k=1}$ and $W_{kmini}$ are indeed less than the maximum total power available for flight, thereby guaranteeing that the aircraft descends slowly in order to land, and in particular in order to pass from an OGE zone to an IGE zone without running the risk of the total power delivered by the power plant becoming insufficient.

In order to correspond to the aerodynamic modeling of the flight of the aircraft as used for defining the first performance curves of the aircraft, this slow descent needs to be performed without any vortex effect appearing. Such a vortex effect appears mainly during rapid descent flight of the aircraft when the main rotor of the aircraft is located in a turbulent air stream that it has itself generated, thereby leading to a sudden loss of lift.

Likewise, it is possible to display two second values $P_{i\_}X$ corresponding respectively to the second characteristic power $W_{k=1}$ and to the third characteristic power $W_{kmini}$ together with a first value $P_{i\_}$lim corresponding to the maximum total power available for flight simultaneously on the graphics type representation. Prior to engaging the predetermined maneuver X, the pilot can thus verify that both second values $P_{i\_}X$ are indeed less than the first value $P_{i\_}$lim.

Furthermore, the method of the invention for determining parameters that are characteristic of the operation of the aircraft makes it possible to perform a slow descent of the aircraft automatically from a height Hz of the aircraft above the ground down to the ground, followed by landing. For this purpose, the following steps are performed:

determining a total torque to be delivered by the power plant corresponding to a descent power lying in the range defined by the third characteristic power $W_{kmini}$ and the first characteristic power $W_k$;

applying the total torque to the power plant, thereby automatically enabling the aircraft to descend;

measuring the height Hz of the aircraft above the ground; and adjusting the influence coefficient k during the descent of the aircraft as a function of the reduction in the height Hz and thus of the reduction in the first characteristic power $W_k$, and consequently adjusting the total torque to be delivered by the power plant so as to perform descending flight of the aircraft down to ground level followed by a landing.

It is also possible to determine a collective pitch for the main blades that corresponds to the total torque to be delivered by the power plant, and then to apply this collective pitch to the main blades of the main rotor so that the aircraft automatically performs a slow descent until it lands.

Furthermore, in order to avoid the aircraft descending too rapidly and landing hard or even crashing against the ground, it is possible to apply a safety coefficient that increases the third characteristic power $W_{kmini}$. The value of this safety coefficient is preferably proportional to the difference between the third characteristic power $W_{kmini}$ and the first characteristic power $W_k$ so that the descent power converges on the third characteristic power $W_{kmini}$ while the aircraft is descending.

For a rotary wing aircraft, the predetermined maneuver X may also be level cruising flight, corresponding to a vertical speed Vz of the aircraft that is substantially zero and a horizontal Vh that is not zero.

During such cruising flight, the functional characteristics of the aircraft are defined by a series of second performance curves in application of a second formula $W=\theta_2(Vh)$. Under such circumstances, W is the flight power of the aircraft, Vh is the horizontal speed of the aircraft, and $f_2$ is a second function represented by a series of second performance curves of the aircraft.

This series of second performance curves $f_2$ of the aircraft is specific to each aircraft and is provided with the flight manual of the aircraft.

From this series of second curves $f_2$, a horizontal straight line that is tangential to the second curve that corresponds to the flight conditions of the aircraft makes it possible to determine a fourth characteristic power $W_{end}$ and a first characteristic horizontal speed $V_{end}$ suitable for obtaining minimum fuel consumption, and thus maximum flight duration of the aircraft.

From this series of second curves $\eta_2$, a straight line that is tangential to the second curve corresponding to the flight conditions of the aircraft and passing through the origin point of the plot of the second curve makes it possible to determine a fifth characteristic power $W_{range}$ and a second characteristic horizontal speed $V_{range}$ that make it possible to obtain the maximum range that can be achieved by the aircraft.

When the aircraft is subjected to a longitudinal wind, the speed of the longitudinal wind may be taken into account for determining this fifth characteristic power $W_{range}$ and this second characteristic speed $V_{range}$. The straight line tangential to the second curve then no longer passes through the origin point of the plot for the second curve but through a point that is offset along the abscissa axis from the origin point of the plot by the value of the speed of the longitudinal wind.

It is then possible to display the fourth characteristic power $W_{end}$ and the fifth characteristic power $W_{range}$ together with the instantaneous total power consumed for flight of the aircraft and the total maximum power available for flight simultaneously on the graphics type representation. The pilot can then adapt the instantaneous power in compliance with these objectives.

Likewise, it is possible to display two second values $P_{i\_}X$ corresponding respectively to the fourth characteristic power $W_{end}$ and to the fifth characteristic power $W_{range}$ together with a first value $P_{i\_}$lim corresponding to the maximum total power available for flight and a third value $P_{i\_}$inst corresponding to the instantaneous total power consumed for flight of the aircraft simultaneously on the graphics type representation. The pilot can then verify the difference between each second value $P_{i\_}X$ and the first value $P_{i\_}$lim.

For a rotary wing aircraft, a predetermined maneuver X may be climbing flight, corresponding to the aircraft then having a vertical speed Vz that is not zero. By way of example, this climbing flight may be performed after a takeoff stage and in a zone where the aircraft is not subjected to the ground effect.

During this climbing flight, the functional characteristics of the aircraft are defined by a series of third performance curves in application of a third formula:

$$\left(\frac{W}{\sigma}\right)_{V_y} = f_3\left(\frac{M}{\sigma}\right)$$

Under such circumstances, W is the flight power of the aircraft, $\sigma$ is the reduction coefficient, M is the estimated mass of the aircraft, Vy is an optimum climb rate for the aircraft, and $f_3$ is a third function represented by a third series of performance curves of the aircraft. The ratio:

$$\left(\frac{W}{\sigma}\right)_{V_y}$$

is obtained for a vertical speed Vz of the aircraft that is equal to the optimum climb rate Vy of the aircraft, such that the flight power W then corresponds to the optimum climb rate Vy.

This series of third performance curves $f_3$ of the aircraft is specific to each aircraft and is supplied with the flight manual of the aircraft.

Thus, in order to determine a sixth characteristic power $W_{Vy}$ for a climbing flight of the aircraft in an OGE zone, the following steps are performed:

calculating a third value $A_3$ such that:

$$A_3 = \left(\frac{M}{\sigma}\right)$$

using a third performance curve of the aircraft in application of the third function $f_3$ corresponding to the flight conditions of the aircraft and as a function of the third value $A_3$ to determine a fourth value $A_4$ such that:

$$A_4 = \left(\frac{W}{\sigma}\right)_{Vy};$$

and using the fourth value $A_4$ to calculate the sixth characteristic power $W_{Vy}$ corresponding to the optimum climb rate Vy, such that $W_{Vy} = A_4 \cdot \sigma$.

It is then possible to display the sixth characteristic power $W_{Vy}$ and the maximum total power available for the flight of the aircraft together with the instantaneous total power consumed for the flight on the graphics type representation. The pilot can then verify that this sixth characteristic power $W_{Vy}$ is less than the maximum total power available for flight and that the climbing flight can be performed at the optimum speed Vy.

Likewise, it is possible to display a second value $P_i\_X$ corresponding to the sixth characteristic power $W_{Vy}$ together with a first value $P_i\_$lim corresponding to the maximum total power available for flight on the graphics type representation.

Furthermore, the display of the instantaneous total power, the available maximum power, and the characteristic power of the aircraft together with the values $P_i\_$inst, $P_i\_$lim, $P_i\_X$ corresponding to these total powers may be replaced by displaying instantaneous, maximum available, and characteristic powers for each engine of the power plant together with the values $P_i\_$inst, $P_i\_$lim, $P_i\_X$ corresponding to these powers at each of the engines. The way the total power of the power plant is shared between each of the engines is known. This thus provides a graphics type representation for each engine of the power plant.

The power plant also provides a device for determining characteristic parameters of a vehicle, the vehicle having a power plant with at least one engine and mechanical power transmission means together with control means, the device including a plurality of sensors, at least one computer, at least one memory, and display means. The sensors supply measurements of various items of information about the environment of the vehicle and/or the state and the operation of the vehicle and its equipment and/or about the position and the movements of the vehicle relative to its environment, the computer means receiving the measurements from the sensors and processing this information.

The vehicle may also include a radio altimeter for determining a height Hz of the vehicle above the ground.

The memory stores performance curves of the vehicle and computer instructions, the computer means using the computer instructions in order to perform the above-described method of determining parameters characteristic of the vehicle.

BRIEF DESCRIPTION OF THE SEVERAL VIEWS OF THE DRAWINGS

The invention and its advantages appear in greater detail from the following description of examples given by way of illustration and with reference to the accompanying figures, in which:

FIG. 1 shows a rotary wing aircraft having a device for determining parameters that are characteristic of the operation of the aircraft;

FIGS. 2 and 3 are two block diagrams of a method of determining parameters that are characteristic of the operation of the aircraft;

FIGS. 4 to 6 show graphics type representations of the values of each parameter $P_i$; and FIGS. 7 to 10 show performance curves of the aircraft.

DETAILED DESCRIPTION OF THE INVENTION

Figure 8:
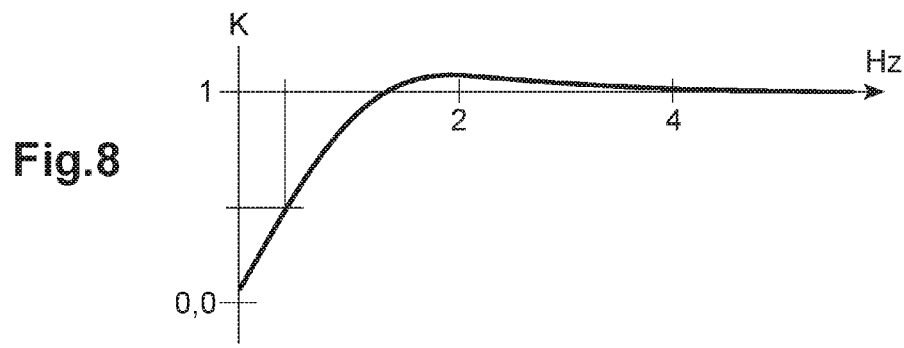

Elements that are present in more than one of the figures are given the same references in each of them.

FIG. 1 shows a rotary wing aircraft 10 having a main rotor 11 with main blades 12, and a tail rotor 13 having an anti-torque function, in particular, the tail rotor 13 being provided with secondary blades 14. The aircraft 10 also has a power plant 20 with two turboshaft engines 21, 22, a main gearbox 23 driving both the main rotor 11 and the tail rotor 13 in rotation, and control means 24, 25, 26 made up of a collective pitch lever 24, a cyclic stick 25, which are respectively means for controlling variation in the collective pitch and in the cyclic pitch of the main blades 12, and pedals 26 comprising means for controlling variation in the collective pitch of the secondary blades 14. These control means 24, 25, 26 enable a pilot to control movements of the aircraft 10. The two turboshaft engines 21 and 22 are identical and each comprises a gas generator and a free turbine. Both engines 21 and 22 deliver substantially the same power to the main gearbox 23 when the two engines 21 and 22 are operating correctly.

Nevertheless, it is possible for the two engines 21 and 22 to be different, in which case they deliver different powers to the main gearbox 23. A particular power-sharing distribution is then defined between the engines 21 and 22.

Finally, the aircraft 10 includes a device 1 for determining parameters that are characteristic of the operation of the aircraft 10, which device has a plurality of sensors 5-8, computer means 2, a memory 3, and display means 4. The sensors 5-8 serve to measure various items of information relating to the environment of the aircraft 10, to the state and to the operation of the aircraft 10 and of the power plant 20, to the state of the control means 24, 25, 26, and also to the position and the movements of the aircraft 10.

By way of example, the sensors 5, 6 comprise means for measuring atmospheric pressure and means for measuring the temperature outside the aircraft 10. By way of example, the sensors 7, 8 comprise means for determining the attitude and the heading of the aircraft 10 such as an attitude and heading reference system (AHRS) device and means for monitoring the power plant 20. The device 1 also includes a radio altimeter 9 for determining the height Hz of the aircraft 10 above the ground.

The device 1 may perform a method of determining parameters that are characteristic of the operation of the aircraft 10 as set out briefly in the diagram of FIG. 2. The memory 3 stores performance curves of the aircraft 10 and computer instructions, and the computer means 2 uses the computer instructions to perform the method.

The method of FIG. 2 comprises five steps.

During a first step 110, measurements are taken of various items of information about the environment of the aircraft 10, and/or the state and the operation of the aircraft 10 and of the power plant 20, and/or the state of the control means 24, 25, 26, and/or the position and the movements of the aircraft 10 relative to its environment. These various items of information are obtained in particular by means of the sensors 5-8.

During a second step 131, at least one first value $P_{i\_}lim$ is determined corresponding to a limit value that a parameter $P_i$ must not exceed, where $P_i$ is a parameter relating to the state or the operation of the aircraft 10 or of the power plant 20, or to the states of the control means 24, 25, 26, or to the position or the movements of the aircraft 10 relative to its environment.

Each parameter $P_i$ may be selected from the following list or it may be a logical or arithmetic combination of at least two elements in the list:

- a total torque delivered by the power plant 20 or a torque delivered by one of the engines 21, 22, or indeed a rotor torque at a mast for driving the main rotor 11 in rotation, or indeed a torque at said tail rotor 13;
- a total power delivered by the power plant 20 or a power delivered by one of the engines 21, 22;
- a speed of the aircraft 10 relative to the air or indeed a speed of the aircraft 10 relative to the ground;
- a height of the aircraft 10 relative to a reference such as the ground;
- a temperature inside an engine 21, 22 such as the temperature of the gas at the inlet to the free turbine;
- a speed of rotation of an element of an engine 21, 22, such as the gas generator;
- a position of a control surface of the aircraft 10 or a pitch value for the main blades 12 of the main rotor 11, or indeed of the secondary blades 14 of the tail rotor 13;
- a position of the control means 24 for controlling the collective pitch of the main blades 12 of the main rotor 11;
- a position of the control means 25 for controlling the cyclic pitch of the main blades 12 of the main rotor 11; and
- a position of the control means 26 for controlling the collective pitch of the secondary blades 14 of the tail rotor 13.

During a third step 132, at least one second value $P_{i\_}X$ is determined to which the parameter $P_i$ should be equal in order to enable the aircraft 10 to perform a predetermined maneuver X.

During an optional fourth step 133, a third value $P_{i\_}inst$ is determined equal to an instantaneous value of each parameter $P_i$.

During a fifth step 140, a common graphics type representation is used for simultaneously displaying each first value $P_{i\_}lim$, each second value $P_{i\_}X$, and each third value $P_{i\_}inst$, if any, in order to show up clearly the position of a first value $P_{i\_}lim$ relative to each second value $P_{i\_}X$ and each third value $P_{i\_}inst$, if any, for each of the parameters $P_i$.

Thus, the pilot can quickly and easily visualize both a first margin that is available between the instantaneous third value $P_{i\_}inst$ and the limit first value $P_{i\_}lim$ for each parameter $P_i$, and also a second margin that is available between the second value $P_{i\_}X$ and the limit first value $P_{i\_}lim$ for each parameter $P_i$. Consequently, the pilot can adapt the use of each parameter $P_i$ depending on the first margin and can anticipate performing the maneuver X depending on the second margin.

The graphics type representation on the display means 4 may take various forms such as a dial 30 of substantially circular shape as shown in FIG. 4 or a vertical scale 40 as shown in FIGS. 5 and 6.

In FIG. 4, two pointers 31, 31' are movable in rotation on the dial 30 and they indicate respectively the third value $P_{i\_}inst$ relating to each engine 21, 22. Marks 32, 33, 34, and 35 are positioned around the dial 30 to show second values $P_{i\_}X$ that correspond respectively to predetermined maneuvers X. The position of each mark 32, 33, 34, and 35 may change depending on the flight conditions of the aircraft 10 and depending on the conditions of the environment surrounding the aircraft 10. Each second value $P_{i\_}X$ and the third value $P_{i\_}inst$ is represented on the dial 30 as a percentage of the first value $P_{i\_}lim$, the first value $P_{i\_}lim$ corresponding to the mark 39 representing a value of 100% on the dial 30.

However, each first value $P_{i\_}lim$, each second value $P_{i\_}X$, and each third value $P_{i\_}inst$ may be represented on the dial 30 as a percentage of a reference value for the parameter $P_i$.

The device 1 for determining parameters that are characteristic of the operation of the aircraft 10 may also have two dials 30 each provided with a single pointer 31, each dial 30 being dedicated to a single one of the engines 21 and 22.

Furthermore, the graduations on the dial 30 go beyond 100%, since each first value $P_{i\_}lim$ generally corresponds to normal and continuous operation of the aircraft and of the engines in particular, however that can be exceeded briefly by a third value $P_{i\_}inst$, e.g. as a result of an engine failing. Furthermore, second values $P_{i\_}X$ can exceed each first value $P_{i\_}lim$, meaning that the predetermined maneuver X requires this first value $P_{i\_}lim$ to be exceeded for the parameter $P_i$.

In FIGS. 5 and 6, a first vertical scale 40 comprises two subscales 55, 56, a first subscale 55 giving the value of the collective pitch of the main blades 12 of the main rotor 11, and a second subscale 56 giving the longitudinal speed of advance of the aircraft 10. Under such circumstances, there is no indication specific to each engine 21, 22 of values relating to the parameter $P_i$. The first value $P_{i\_}lim$ and the second values $P_{i\_}X$ are represented by horizontal marks 49, 42, 43, 44, and 45 as is the third value $P_{i\_}inst$, which is represented by a horizontal mark 41. The first value $P_{i\_}lim$, each second value $P_{i\_}X$, and the third value $P_{i\_}inst$ are represented on the subscale 55 as collective pitch values for the main blades 12. The collective pitch of the main blades 12 of the main rotor 11 of the aircraft 10 is an element that is essential for the pilot of the rotary wing aircraft 10, and this enables the pilot to visualize rapidly and clearly the collective pitch of the main blades 12 corresponding respectively to the first value $P_{i\_}lim$, to the second value $P_{i\_}X$, and to the third value $P_{i\_}inst$, together with the margins between these collective pitch values.

In FIG. 5, a second scale 60 gives the height Hz of the aircraft 10 above the ground. The current value of this height Hz is determined by means of the radio altimeter 9 and is displayed by the mark 61.

By way of example, the display means 4 may be a first limit indicator of the aircraft 10.

Furthermore, the parameters $P_i$ shown in FIGS. 4 to 6 are frequently determined in correlation with the flight power of the aircraft 10 or with the flight power of each engine 21, 22.

The flight power of the aircraft 10 is the sum of the power needed by the main rotor 11 plus the power needed by the tail rotor 13 in order to enable the aircraft 10 to fly.

In addition, the total power delivered by the power plant 20 is the sum of this flight power plus an accessory power that is needed to power equipment on board the aircraft 10.

In addition, the total power delivered by the power plant is substantially equal to the sum of the powers delivered by each of the engines 21 and 22 respectively of the power plant 20, this total power being delivered in substantially equal manner by each of the engines 21 and 22 when these two identical engines 21 and 22 are operating correctly.

Consequently, the flight power of the aircraft 10 is equal to the total power delivered by the power plant 20 minus the accessory power. Likewise, the flight power at each engine 21, 22 is equal to half the flight power of the aircraft 10.

The method of determining parameters that are characteristic of operation may then include intermediate substeps between the first and second steps 110, 131. A summary diagram of such a method then comprises a total of nine steps and substeps, and is shown in FIG. 3.

During a first substep 121, an available power margin is determined for each engine 21, 22 relative to a minimum guaranteed power, the available power margin characterizing an aging state of each engine 21, 22.

During a second substep 122, an instantaneous power $Wm_{inst}$ is determined as delivered by each engine 21, 22.

During a third substep 123, a maximum available power is determined from each engine 21, 22 by taking account of the available power margin.

During a fourth substep 124, a characteristic power is determined for each engine 21, 22 that corresponds to a predetermined maneuver X of the aircraft 10.

Thereafter, during the second step 131, two first values $P_i\_lim$ are determined that correspond respectively to the maximum available power from each engine 21, 22.

During the third step 132, two second values $P_i\_X$ are determined corresponding to a characteristic power for each engine 21, 22 in order to perform the predetermined maneuver X of the aircraft 10.

During the fourth step 133, two third values $P_i\_inst$ are determined corresponding respectively to the instantaneous power $Wm_{inst}$ delivered by each engine 21, 22.

Finally, during the fifth step 140, a common graphics type representation is used to display simultaneously the first value $P_i\_lim$, each second value $P_i\_X$, and the third value $P_i\_inst$ for each engine 21, 22.

Under such circumstances, the parameter $P_i$ relates to the operation of an engine, such as the engine torque $C_m$ delivered by an engine 21, 22, the internal temperature T4 of the gas at the inlet to the free turbine of an engine 21, 22, or indeed the speed of rotation Ng of the gas generator of the engine 21, 22.

In addition, in order to limit the number of parameters $P_i$ that the pilot needs to monitor, only the most critical parameter $P_i$ is displayed on the display means 4. This parameter $P_i$ that is the most critical for piloting the aircraft 10 is the parameter for which the difference between the third value $P_i\_inst$ and the first value $P_i\_lim$ is the smallest. Thus, the pilot can rapidly and clearly visualize the margin presently available under the current conditions of flight and also for the purpose of performing the intended predetermined maneuver X.

The available power margin from each engine 21, 22 of the power plant 20 may be determined during an "engine health" inspection that needs to be performed regularly.

The instantaneous power $Wm_{inst}$ delivered by each engine 21, 22 may be defined using the formula $Wm_{inst}=C_m \cdot Ng$, where $C_m$ is the engine torque delivered by the engine 21, 22, and Ng is the speed of rotation of the gas generator of that engine 21, 22.

The instantaneous power $Wm_{inst}$ delivered by each engine 21, 22 may also be determined from the flight power of the aircraft 10. The power at the main rotor 11 is known using the formula $Wm_{inst}=C_R \cdot NR$, where NR is the instantaneous speed of rotation of the main rotor 11, and $C_R$ is the rotor torque at a drive mast of the main rotor 11. Likewise, the power at the tail rotor 13 and the accessory power can also be determined in known manner. Finally, this instantaneous total power $W_{inst}$ delivered by the power plant is shared equally by the engines 21 and 22 when both engines 21 and 22 are operating correctly.

The characteristic power of each engine 21, 22 is then determined depending on the predetermined maneuver X that the pilot of the aircraft 10 intends to perform. By way of example, this predetermined maneuver X may be hovering flight, landing, or indeed cruising flight.

When the aircraft 10 is hovering, the functional characteristics of the aircraft 10 are characterized by a series of first performance curves as shown in FIG. 7. These first performance curves are defined by a first formula:

$$\frac{W}{\sigma} \cdot \left(\frac{NR_0}{NR}\right)^3 = k \cdot f_1\left[\frac{M}{\sigma} \cdot \left(\frac{NR_0}{NR}\right)^2\right]$$

where W is the flight power of the aircraft 10, $\sigma$ is a reduction coefficient, k is a coefficient for the influence of the ground on the behavior of the aircraft 10 as a function of the height Hz of the aircraft 10 above the ground, M is the estimated mass of the aircraft 10, $NR_0$ is the setpoint for the speed of rotation of the main rotor 11, NR is the real speed of rotation of the main rotor 11, and $f_1$ is a first function represented by a series of first performance curves for the aircraft 10. In FIG. 7, the abscissa axis of these first performance curves corresponds to a first value:

$$A_1 = \frac{M}{\sigma} \cdot \left(\frac{NR_0}{NR}\right)^2$$

and the ordinate axis corresponds to a second value:

$$A_2 = \frac{W}{\sigma} \cdot \left(\frac{NR_0}{NR}\right)^3$$

The influence coefficient k is specific to each aircraft 10 and is defined by a ground influence curve shown in FIG. 8 in which the abscissa axis represents the height Hz of the aircraft 10 above the ground and the ordinate axis represents the influence coefficient k. On the curve shown in FIG. 8, this influence coefficient k lies in the range 0.9 to 1.1.

In order to determine the characteristic flight power of the aircraft 10 while hovering, the reduction coefficient $\sigma$ is calculated initially such that:

$$\sigma = \left(\frac{P_0}{T_0}\right);$$

and then the first value $A_1$ is calculated such that:

$$A_1 = \frac{M}{\sigma} \cdot \left(\frac{NR_0}{NR}\right)^2$$

The mass M may be an estimated mass for the aircraft 10 as determined prior to takeoff or indeed it is preferably an estimated instantaneous mass $M_{inst}$ of the aircraft 10.

Thereafter, the height Hz of the aircraft 10 above the ground is measured, e.g. by means of the radio altimeter 9 of the aircraft 10, and the influence coefficient k corresponding to the height Hz is determined using the ground influence curve of FIG. 8.

Thereafter, a first performance curve of the aircraft 10 representing the first function $f_1$ corresponding to the flight conditions of the aircraft as a function of the first value $A_1$ is used to determine a second value $A_2$ such that:

$$A_2 = f_1\left[\frac{M}{\sigma} \cdot \left(\frac{NR_0}{NR}\right)^2\right]$$

as shown in FIG. 7.

Finally, using the second value $A_2$, a first characteristic power $W_k$ of the aircraft 10 is calculated for hovering flight with or without ground effect depending on the height Hz of the aircraft 10 above the ground and depending on the influence coefficient k such that:

$$W_k = k \cdot A_2 \cdot \sigma \cdot \left(\frac{NR}{NR_0}\right)^3.$$

The characteristic power of each engine 21, 22 for hovering flight with or without the ground effect is then equal to half this first characteristic power $W_k$ of the power plant.

In order to determine a second characteristic power $W_{k=1}$ of the aircraft 10 during hovering flight without ground effect, the influence coefficient k is defined as being equal to 1 and the second value $A_2$ is used to calculate the second characteristic power $W_{k=1}$ such that:

$$W_{k=1} = A_2 \cdot \sigma \cdot \left(\frac{NR}{NR_0}\right)^3$$

In order to determine a third characteristic power $W_{kmini}$ of the aircraft 10 during hovering flight at ground level, a minimum influence coefficient k is defined such that $k_{mini}$=0.9 as shown by the ground influence curve of FIG. 8, and the second value $A_2$ is used to calculate the third characteristic power $W_{kmini}$ such that:

$$W_{kmini} = (0.9) \cdot A_2 \cdot \sigma \cdot \left(\frac{NR}{NR_0}\right)^3$$

Thereafter, it is possible to determine the second value $P_i X$ that corresponds respectively to the second characteristic power $W_{k=1}$ and to the third characteristic power $W_{kmini}$, and then display them on the display means 4 by using the marks 34 and 35 of the dial 30 in FIG. 4 and the marks 44 and 45 on the scale 55 in FIG. 5. In addition, on the scale 60 in FIG. 5, a mark 61 indicates the lowest height $Hz_k$ that corresponds to the coefficient k being equal to 1. This lowest height $Hz_k$ is defined by the curve shown in FIG. 8, plotting variation in the coefficient k as a function of height Hz. Thus, the pilot of the aircraft 10 can visualize the height $Hz_k$ that will be reached if the current value of the collective pitch is modified progressively to the mark 44 corresponding to the second value $P_i X$ that corresponds to the second characteristic power $W_{k=1}$. In contrast, this modification to the value of the collective pitch needs to be progressive in order to limit the dynamic and inertial effects of this descent of the aircraft 10.

The aircraft 10 can also descend slowly automatically towards a landing as a result of calculating the first characteristic power $W_k$ and the third characteristic power $W_{kmini}$.

For this purpose, the torque that needs to be delivered by each engine 21, 22 and corresponding to a descent power lying in the range from the third characteristic power $W_{kmini}$ to the first characteristic power $W_k$ is determined by taking account of the accessory power and possibly also of a safety coefficient, and then this torque is applied to each engine 21, 22. Thereafter, the influence coefficient k during the descent of the aircraft 10 is adjusted as a function of the reduction in the height Hz and thus in the first characteristic power $W_k$, and consequently in the torque that each engine 21, 22 needs to deliver until the aircraft 10 lands.

It is also possible to determine the collective pitch of the main blades 12 of the main rotor 11 that corresponds to this descent power lying in the range from the third characteristic power $W_{kmini}$ to the first characteristic power $W_k$. The collective pitch is applied to the main blades 12 of the main rotor 11, e.g. via an autopilot of the aircraft 10, thereby automatically causing the aircraft 10 to descend slowly towards a landing. The value of this collective pitch is then adjusted as a result of the aircraft 10 descending and the variation in the influence coefficient k is adjusted as a function of the reduction in the height Hz.

Furthermore, using the maximum available total power from the power plant 20 and the first performance curves in application of the first function $f_1$ as shown in FIG. 7, it is possible to determine the maximum mass that can be transported by the aircraft 10. Specifically, the maximum transportable mass is the difference between the mass of the aircraft 10 for which the total power delivered by the power plant 20 is equal to the available maximum total power, while taking account of the available power margin, and the estimated instantaneous mass $M_{inst}$ of the aircraft 10. This maximum transportable mass can then be indicated to the pilot 10 on the display means 4 by means of a visual indication 38, 48.

Figure 9:
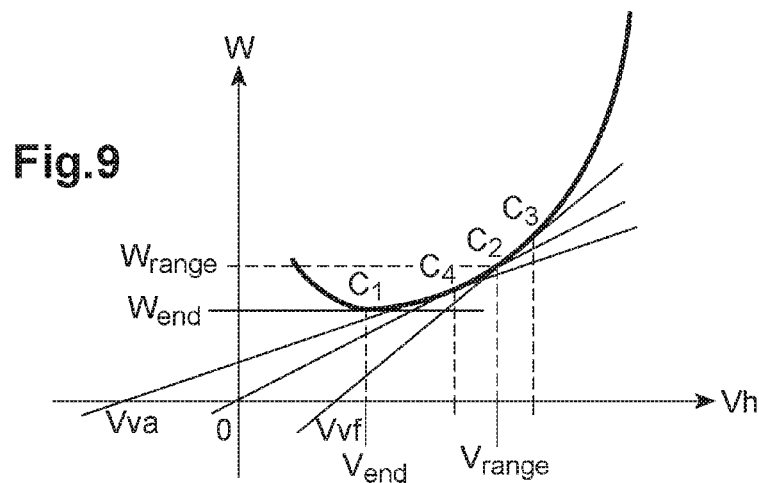

While the aircraft 10 is in cruising flight, the functional characteristics of the aircraft 10 are characterized by a series of second performance curves shown in FIG. 9. These second performance curves are defined by a second formula $W=f_2(Vh)$, where Vh is the horizontal speed of the aircraft 10 and $f_2$ is a second function represented by a series of second performance curves for the aircraft 10. In FIG. 9, the abscissa axis of the second performance curves is constituted by the horizontal speed Vh of the aircraft 10, and the ordinate axis is constituted by the flight power W of the aircraft 10.

These second performance curves $f_2$ pass via a minimum level of power consumption by the power plant 20, which is a fourth characteristic power $W_{end}$ serving to minimize consumption by the power plant 20 and maximize the duration of flight for the aircraft under conditions of cruising flight. A first characteristic point $C_1$ of this fourth characteristic power $W_{end}$ is determined in FIG. 9 by the point where a horizontal straight line is tangential to the second performance curve that corresponds to the conditions of flight of the aircraft 10. The first characteristic horizontal speed $V_{end}$ corresponding to this fourth characteristic power $W_{end}$ is also defined by this first characteristic point $C_1$.

From these second performance curves, it is possible to determine a fifth characteristic power $W_{range}$ and a second characteristic horizontal speed $V_{range}$ corresponding to the best compromise between the speed of advance of the aircraft and its power consumption enabling the maximum range of the aircraft 10 to be obtained under these cruising flight conditions. A second characteristic point $C_2$ of this fifth characteristic power $W_{range}$ is determined in FIG. 9 by the intersection between the second performance curve that corresponds to the flight conditions of the aircraft 10 and a straight line tangential to this second curve and passing through the origin point of the FIG. 9 plot. The second characteristic horizontal speed $V_{range}$ corresponding to this fifth characteristic power $W_{range}$ is also defined by this second characteristic point $C_2$.

In the event of the aircraft 10 being subjected to longitudinal wind, this straight line tangential to the second curve no longer passes through the origin point of the FIG. 9 plot, but rather through a point that is offset along the abscissa axis away from the origin of the plot by the value of the longitudinal wind speed. Thus, in the event of the aircraft 10 suffering a head wind, the fifth characteristic power $W_{range}$ and the second characteristic horizontal speed $V_{range}$ are defined by the third characteristic point $C_3$ in FIG. 9, the head wind speed Vvf being positive. Likewise, in the event of the aircraft 10 being subjected to a tail wind, the fifth characteristic power $W_{range}$ and the second characteristic horizontal speed $V_{range}$ are defined by the fourth characteristic point $C_4$ of FIG. 9, the speed of the tail wind Vva being negative.

It is then possible to determine the second values $P_i\_X$ corresponding respectively to the fourth characteristic power $W_{end}$ and the fifth characteristic power $W_{range}$, and then display them on the display means 4 using the marks 32 and 33 in FIG. 4 and the marks 42 and 43 in FIG. 6. As shown in FIG. 6, it is also possible to display the first characteristic horizontal speed $V_{end}$ and the second characteristic horizontal speed $V_{range}$ on the second subscale 56 giving the longitudinal speed of advance of the aircraft 10.

Figure 10:
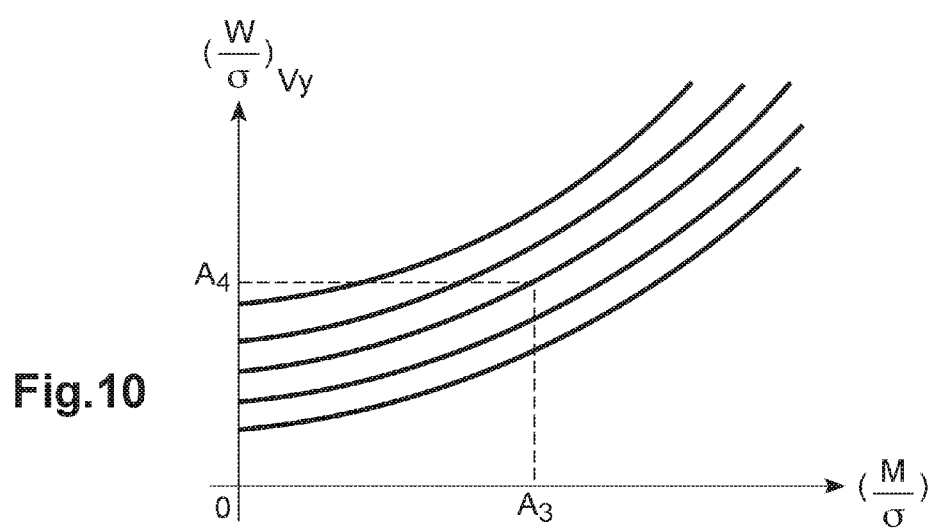

When the aircraft 10 is climbing, functional characteristics of the aircraft 10 are characterized by a third series of performance curves shown in FIG. 10. These third performance curves are defined by a third formula:

$$\left(\frac{W}{\sigma}\right)_{V_y} = f_3\left(\frac{M}{\sigma}\right)$$

where W is the flight power of the aircraft 10, Vy is the optimum climb rate of the aircraft 10, and $f_3$ is a third function represented by a series of third performance curves for the aircraft 10. The ratio:

$$\left(\frac{W}{\sigma}\right)_{V_y}$$

is thus obtained for a vertical speed Vz of the aircraft that is equal to the optimum climb rate Vy and enables a sixth characteristic power $W_{Vy}$ to be determined that corresponds to the aircraft 10 climbing at an optimum climb rate Vy.

A third value $A_3$ is calculated such that:

$$A_3 = \left(\frac{M}{\sigma}\right)$$

given the mass M of the aircraft 10 and the reduction coefficient σ. Thereafter, a fourth value $A_4$ is determined from a third performance curve of the aircraft 10 corresponding to the flight conditions of the aircraft in application of the third function $f_3$ and as a function of the third value $A_3$, such that:

$$A_4 = f_3\left(\frac{M}{\sigma}\right)$$

Thereafter, using the fourth value $A_4$, the sixth characteristic power $W_{Vy}$ is calculated that corresponds to the optimum climb rate Vy, such that $W_{Vy} = A_4 \cdot \sigma$.

Naturally, the present invention may be subjected to numerous variations as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A method of determining parameters that are characteristic of the operation of a vehicle, the vehicle having a power plant having at least one engine and main gearbox, a control assembly for controlling movements of the vehicle, a plurality of sensors, at least one computer, at least one memory, and at least one display, the method comprising the following steps: measuring various items of information about the environment of the vehicle, and/or the state and the operation of the vehicle and of the power plant, and/or the states of the control assembly, and/or the position and the movements of the vehicle relative to its environment; determining via the at least one computer an available power margin for each engine of the power plant relative to a minimum guaranteed power, the available power margin characterizing an aging state of each engine of the power plant; determining via the at least one computer an available maximum power from each engine of the power plant by taking account of the available power margin; determining via the at least one computer at least one power characteristic of each engine of the power plant corresponding to performing a predetermined maneuver X of the vehicle, determining via the at least one computer at least a first value Pi_lim corresponding to the available maximum power of each engine of the power plant, and a limit value that a parameter Pi must not exceed, Pi being a parameter relative to the state or to the operation of the vehicle, or to the state or the operation of the power plant, or to the states of the control assembly, or to the position or to the movements of the vehicle relative to its environment; determining via the at least one computer at least one second value Pi_X corresponding to a characteristic power of each engine for performing a predetermined maneuver X of the vehicle and to which the parameter Pi must be equal in order to enable the vehicle to perform the predetermined maneuver X; and simultaneously displaying on a common graphics type representation each first value Pi_lim and each second value Pi_X in order to show clearly the relative position between a first value Pi_lim and each second value Pi_X for each parameter Pi.

2. A method according to claim 1, characterized by the following steps: determining via the at least one computer an instantaneous power Wminst delivered by each engine of the power plant; determining via the at least one computer at least one third value Pi_inst corresponding to the instantaneous power Wminst delivered by each engine and equal to an instantaneous value of each parameter Pi; and displaying each third value Pi_inst on the graphics type representation.

3. A method according to claim 1, wherein each second value Pi_X and each third value Pi_inst, if any, is displayed on the at least one display as a percentage relative to the first value Pi_lim corresponding to the parameter Pi.

4. A method according to claim 1, wherein each first value Pi_lim, each second value Pi_X, and each third value Pi_inst, if any, is displayed on the at least one display as a percentage relative to a reference value of the parameter Pi.

5. A method according to claim 1, wherein the vehicle is a rotary wing aircraft having a main rotor with main blades, the control assembly controlling variation in the collective pitch of the main blades, and values for the collective pitch of the main blades are displayed on the at least one display, which values correspond respectively to each first value Pi_lim, to each second value Pi_X, and to each third value Pi_inst, if any.

6. A method according to claim 2, wherein each first value $P_i\_lim$, each second value $P_i\_X$, and each third value $P_i\_inst$ is displayed on a first limit indicator (FLI) of the vehicle.

7. A method according to claim 1, wherein an estimated instantaneous mass $M_{inst}$ is determined for the vehicle via the at least one computer in order to determine each characteristic power.

8. A method according to claim 7, wherein an available maximum total power at the power plant equal to the sum of the available maximum powers of each engine is used by the at least one computer to determine a maximum mass that can be transported by the vehicle, the maximum transportable mass being the difference between the mass of the vehicle for which a total power delivered by the power plant is equal to the available maximum total power in application of performance curves of the vehicle while taking account of the available power margin, and the estimated instantaneous mass $M_{inst}$ of the vehicle.

9. A method according to claim 1, wherein the vehicle is a rotary wing aircraft having a main rotor with main blades, an anti-torque rotor with secondary blades, and the main gearbox drives rotation of the main rotor and the anti-torque rotor when the aircraft is hovering with its horizontal speed Vh and its vertical speed Vz being substantially zero, and the functional characteristics of the aircraft are characterized in particular by a series of first performance curves using a first formula carried out by the at least one computer:

$$\frac{W}{\sigma} \cdot \left(\frac{NR_0}{NR}\right)^3 = k \cdot f_1\left[\frac{M}{\sigma} \cdot \left(\frac{NR_0}{NR}\right)^2\right]$$

where W is a flight power of the aircraft (10), $\sigma$ is a reduction coefficient, k is a coefficient for the influence of the ground on the behavior of the aircraft as a function of the height Hz of the aircraft above the ground, M is the estimated mass of the aircraft, $NR_0$ is a setpoint for the speed of rotation of the main rotor, NR is the real speed of rotation of the main rotor, and $f_1$ is a first function represented by a series of first performance curves for the aircraft, the flight power W of the aircraft being equal to the sum of the powers delivered by each engine of the power plant minus accessory power needed for powering equipment on board the aircraft, the method comprising the following steps:

calculating via the at least one computer the reduction coefficient $\sigma$ such that:

$$\sigma = \left(\frac{P_0}{T_0}\right)$$

calculating via the at least one computer a first value $A_1$ such that:

$$A_1 = \frac{M}{\sigma} \cdot \left(\frac{NR_0}{NR}\right)^2$$

measuring the height Hz of the aircraft above the ground;
determining via the at least one computer the influence coefficient k corresponding to the height Hz;
using a first performance curve of the aircraft in application of the first function $f_1$ corresponding to the flight conditions of the aircraft and as a function of the first value $A_1$ to determine a second value $A_2$ as carried out by the at least one computer such that:

$$A_2 = f_1\left[\frac{M}{\sigma} \cdot \left(\frac{NR_0}{NR}\right)^2\right]$$

using the second value $A_2$ to calculate a first characteristic power $W_k$ of the aircraft when hovering with or without the ground effect depending on the influence coefficient k, as carried out by the at least one computer, such that:

$$W_k = k \cdot A_2 \cdot \sigma \cdot \left(\frac{NR}{NR_0}\right)^3.$$

10. A method according to claim 9, wherein the following step is performed by the at least one computer: defining the influence coefficient k as being equal to 1, corresponding to hovering flight outside the ground effect of the aircraft, and using the second value $A_2$ to calculate a second characteristic power $W_{k=1}$ of the aircraft when hovering outside the ground effect of the aircraft such that:

$$W_{k-1} = A_2 \cdot \sigma \cdot \left(\frac{NR}{NR_0}\right)^3.$$

11. A method according to claim 10, wherein a mark is displayed on a scale representing the height Hz of the aircraft above the ground, the mark indicating the lowest height Hzk that corresponds to the coefficient k being equal to 1.

12. A method according to claim 9, comprising the following steps carried out by the at least one computer: defining the influence coefficient k equal to a minimum value $k_{mini}$ corresponding to hovering flight of the aircraft at ground level; and using the second value $A_2$ to calculate the third characteristic power $W_{kmini}$ of the aircraft when the aircraft is hovering at ground level such that:

$$W_{kmini} = k_{mini} \cdot A_2 \cdot \sigma \cdot \left(\frac{NR}{NR_0}\right)^3.$$

13. A method according to claim 9, comprising the following steps carried out by the at least one computer:
defining the influence coefficient k as being equal to a minimum value $k_{mini}$ corresponding to the aircraft hovering at ground level;
using the second value $A_2$ to calculate a third characteristic power $W_{kmini}$ of the aircraft when hovering at ground level such that:

$$W_{kmini} = k_{mini} \cdot A_2 \cdot \sigma \cdot \left(\frac{NR}{NR_0}\right)^3,$$

determining a total torque that needs to be supplied by the power plant corresponding to a power of the power plant lying in the range from the third characteristic power $W_{kmini}$ to the first characteristic power $W_k$;
applying the total torque to the power plant, thereby automatically leading to slow descent towards a landing; and
adjusting the influence coefficient k during the descent of the aircraft as a function of the reduction in the height Hz and thus in the first characteristic power $W_k$, and consequently adjusting the total power to be delivered by the power plant until the aircraft.

14. A method according to claim 9, wherein the control assembly controls variation in the collective pitch and in the cyclic pitch of the main blades and the following steps are performed by the at least one computer:
defining the influence coefficient k equal to a minimum value $k_{mini}$ corresponding to the aircraft hovering at ground level;
using the second value $A_2$ to calculate a third characteristic power $W_{kmini}$ of the aircraft when hovering at ground level such that:

$$W_{kmini} = k_{mini} \cdot A_2 \cdot \sigma \cdot \left(\frac{NR}{NR_0}\right)^3,$$

determining a collective pitch for the main blades corresponding to a power from the power plant lying in the range from the third characteristic power $W_{kmini}$ to the first characteristic power $W_k$;
applying the collective pitch to the main blades, thereby automatically leading to slow descent towards a landing; and
adjusting the influence coefficient k during the descent of the aircraft as a function of the reduction in the height Hz and thus in the first characteristic power $W_k$, and consequently adjusting the collective pitch until the aircraft lands.

15. A method according to claim 1, wherein when the vehicle is a rotary wing aircraft in cruising flight, its vertical speed Vz being substantially zero, use is made of a series of second performance curves in application of a second formula $W=f_2(Vh)$ carried out by the at least one computer, where W is a flight power of the aircraft and Vh is the horizontal speed of the aircraft, and a horizontal straight line tangential to the second curve that corresponds to the flight conditions of the aircraft to determine via the at least one computer a fourth characteristic power $W_{end}$ of the aircraft and a first characteristic horizontal speed $V_{end}$ of the aircraft, thereby making it possible for the at least one computer to obtain a maximum flight duration for the aircraft, the flight power W of the aircraft being equal to the sum of the powers delivered by each engine of the power plant minus an accessory power needed for powering equipment on board the aircraft.

16. A method according to claim 1, wherein when the vehicle is a rotary wing aircraft in cruising flight, its vertical speed Vz being substantially zero, use is made of a second series of performance curves in application of a second formula $W=f_2(Vh)$ carried out by the at least one computer, where W is a flight power of the aircraft, Vh is the horizontal speed of the aircraft, and $f_2$ is a second function represented by a series of second performance curves of the aircraft, and a straight line tangential to the second curve that corresponds to the flight conditions of the aircraft and that passes through the origin point of the plot of the second curve to determine via the at least one computer a fifth characteristic power $W_{range}$ of the aircraft and a second characteristic horizontal speed $V_{range}$ of the aircraft making it possible for the at least one computer to obtain a maximum range for the aircraft, the flight power W of the aircraft being equal to the sum of the powers delivered by each engine of the power plant minus an accessory power needed for powering equipment on board the aircraft.

17. A method according to claim 16, wherein in the event of the aircraft being subjected to longitudinal wind, the straight line tangential to the second curve does not pass through the origin point of the plot of the second curve but passes through a point that is offset along the abscissa axis from the origin point of the plot by the value of the longitudinal wind speed.

18. A method according to claim 1, wherein when the vehicle is a rotary wing aircraft climbing, its vertical speed Vz being non-zero, use is made of functional characteristics of the aircraft characterized in particular by a series of third performance curves in application of a third formula carried out by the at least one computer:

$$\left(\frac{W}{\sigma}\right)_{Vy} = f_3\left(\frac{M}{\sigma}\right);$$

where W is a flight power of the aircraft, σ is a reduction coefficient, M is the estimated mass of the aircraft, Vy is the optimum rate of climb of the aircraft, $f_3$ being a third function represented by a series of third performance curves of the aircraft, the ratio:

$$\left(\frac{W}{\sigma}\right)_{Vy}$$

being obtained by the at least one computer for a vertical speed Vz of the aircraft equal to the optimum climb rate Vy of the aircraft, such that a sixth characteristic power $W_{Vy}$ of the aircraft corresponds to the optimum climb rate Vy, the flight power W of the aircraft being equal to the sum of the powers delivered by each engine of the power plant minus an accessory power needed to power equipment on board the aircraft, and the following steps are performed by the at least one computer:

calculating the reduction coefficient σ such that:

$$\sigma = \left(\frac{P_0}{T_0}\right)$$

calculating a third value $A_3$ such that:

$$A_3 = \left(\frac{M}{\sigma}\right)$$

using a third performance curve of the aircraft in application of the third function $f_3$ corresponding to the flight conditions of the aircraft and as a function of the third value $A_3$ to determine via the at least one computer a fourth value $A_4$ such that:

$$A_4 = f_3\left(\frac{M}{\sigma}\right)$$

using the fourth value $A_4$ to calculate the sixth characteristic power $W_{Vy}$ corresponding to the optimum climb rate $V_y$, such that $W_{Vy} = A_4 \cdot \sigma$.

19. A method according to claim 1, wherein the parameter $P_i$ is selected from the following list or else is a logical or arithmetic combination of at least two of the elements of the following list as carried out by the at least one computer: a total torque delivered by the power plant or else an outlet torque from the main gearbox, or else a torque delivered by an engine; a total power delivered by the power plant or a power delivered by one of the engines; a speed of the vehicle relative to the air, or a speed of the vehicle relative to the ground; a height of the vehicle relative to a reference; a temperature inside an engine; and a speed of rotation of an element of an engine.

20. A method according to claim 1, wherein when the vehicle is a rotary wing aircraft having a main rotor with main blades, an anti-torque rotor with secondary blades, the main gearbox drives the main rotor and the anti-torque rotor, and the control assembly controls variation in the collective pitch and in the cyclic pitch of the main blades and controls the collective pitch of the secondary blades, the parameter $P_i$ is selected from the following list or else is a logical or arithmetic combination of at least two elements from the following list as carried out by the at least one computer:

a total torque delivered by the power plant or a torque delivered by one of the engines or indeed a rotor torque at a mast for driving the main rotor in rotation, or indeed a torque at the anti-torque rotor;

a total power delivered by the power plant or indeed a power delivered by one of the engines;

a speed of the aircraft relative to the air or a speed of the aircraft relative to the ground;

a height of the aircraft relative to a reference;

a temperature inside an engine;

a speed of rotation of an element of an engine;

a position of a control surface of the aircraft or a pitch value of the main blades of the main rotor, or indeed of the secondary blades of the anti-torque rotor;

a collective pitch control position for the main blades of the main rotor;

a cyclic pitch control position for the main blades of the main rotor; and a collective pitch control position for the secondary blades of the anti-torque rotor.

21. A method according to claim 1, wherein the second values $P_i\_X$ to which the parameter $P_i$ must be equal to enable the vehicle (10) to perform a predetermined maneuver X forms a range of values for the parameter $P_i$.

22. A method according to claim 2, wherein at least one third value $P_i\_inst$ equal to an instantaneous value of each parameter $P_i$ is determined via the at least one computer, and the following are displayed: each first value $P_i\_lim$; each second value $P_i\_X$; and each third value $P_i\_inst$ for that one of the parameters $P_i$ selected from at least two parameters $(P_i, P_j)$ for which the difference between the first value $P_i\_lim$ and the third value $P_i\_inst$ associated respectively with each of the parameters $(P_i, P_j)$ is the smallest.

23. A device for determining parameters that are characteristic of the operation of a vehicle, the vehicle having a power plant with at least one engine and a main gearbox, the vehicle also having a control assembly, the device having a plurality of sensors, at least one computer, at least one memory, and a display, the sensors providing measurements of various items of information about the environment of the vehicle and/or the state and the operation of the vehicle and of its equipment, and/or the position and the movements of the vehicle relative to its environment, the at least one computer receiving the measurements from the sensors and processing the information, wherein the memory stores performance curves of the vehicle and computer instructions, the at least one computer using the computer instructions to perform the method according to claim 1 for determining parameters that are characteristics of the operation of the vehicle.

* * * * *